（12）United States Patent
Yan et al.

(10) Patent No.: US 8,934,852 B2
(45) Date of Patent: Jan. 13, 2015

(54) ANTENNA SWITCH CONFIGURATION DEVICES, METHODS AND SYSTEMS

(71) Applicant: QUALCOMM Incorporated, San Diego, CA (US)

(72) Inventors: Hongbo Yan, Vista, CA (US); Daniel Fred Filipovic, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 107 days.

(21) Appl. No.: 13/841,835

(22) Filed: Mar. 15, 2013

(65) Prior Publication Data

US 2013/0309982 A1 Nov. 21, 2013

Related U.S. Application Data

(60) Provisional application No. 61/649,704, filed on May 21, 2012, provisional application No. 61/716,582,
(Continued)

(51) Int. Cl.
*H04B 1/00* (2006.01)
*H04B 7/00* (2006.01)
(Continued)

(52) U.S. Cl.
CPC ............... *H01Q 3/24* (2013.01); *H04W 24/02* (2013.01); *H04B 7/0404* (2013.01);
(Continued)

(58) Field of Classification Search
USPC ............. 455/25, 63.1, 63.4, 67.11, 67.13, 68, 455/69, 78, 79, 101, 226.1, 226.2, 226.3; 343/876
See application file for complete search history.

(56) References Cited

U.S. PATENT DOCUMENTS 5,481,571 A 1/1996 Balachandran et al.
5,530,926 A 6/1996 Rozanski
(Continued)

FOREIGN PATENT DOCUMENTS

EP 746118 A1 12/1996
EP 1175021 A2 1/2002
(Continued)

OTHER PUBLICATIONS

Chapter II Demand & Response Under PCT Article 34—The International Preliminary Examining Authority; Feb. 28, 2014; (PCT/US2013/041883).
(Continued)

*Primary Examiner* — Tuan A Tran

(57) ABSTRACT

A wireless communication apparatus is provided that includes a plurality of antennas and at least one receive or transmit circuit. The apparatus further includes a controller configured to: determine one or more performance characteristics associated with a first antenna while the circuit is connected to the first antenna; switch the circuit from the first antenna to a second antenna; determine one or more performance characteristics associated with the second antenna after the switch; compare the performance characteristics associated with the antennas; determine whether to maintain the switch to the second antenna or to switch the circuit back to the first antenna; and determine a duration of time to maintain a connection between the selected antenna and the circuit based, at least, on one or more performance characteristics. Other aspects, embodiments, and features are also claimed and described.

28 Claims, 9 Drawing Sheets

Related U.S. Application Data filed on Oct. 21, 2012, provisional application No. 61/734,276, filed on Dec. 6, 2012, provisional application No. 61/737,715, filed on Dec. 14, 2012, provisional application No. 61/716,586, filed on Oct. 21, 2012, provisional application No. 61/716,599, filed on Oct. 21, 2012, provisional application No. 61/716,902, filed on Oct. 22, 2012, provisional application No. 61/736,541, filed on Dec. 12, 2012.

(51) Int. Cl.
| | | |
|---|---|---|
| *H01Q 3/24* | (2006.01) | |
| *H04W 24/02* | (2009.01) | |
| *H04B 7/04* | (2006.01) | |
| *H04W 72/08* | (2009.01) | |
| *H04W 76/02* | (2009.01) | |
| *H04W 36/30* | (2009.01) | |
| *H04B 1/44* | (2006.01) | |
| *H04W 36/14* | (2009.01) | |
| *H04W 88/06* | (2009.01) | |
| *H04B 7/06* | (2006.01) | |
| *H04B 7/08* | (2006.01) | |

(52) U.S. Cl.
CPC .......... *H04W 72/085* (2013.01); *H04W 76/027* (2013.01); *H04W 36/30* (2013.01); *H04B 1/44* (2013.01); *H04W 36/14* (2013.01); *H04W 88/06* (2013.01); *H04B 7/0608* (2013.01); *H04B 7/0814* (2013.01)
USPC ................ 455/69; 455/68; 455/25; 455/63.1; 455/63.4; 455/67.11; 455/67.13; 455/101; 455/226.1; 455/226.2; 455/226.3; 343/876

(56) References Cited

U.S. PATENT DOCUMENTS

| | | | |
|---|---|---|---|
| 5,541,963 A | | 7/1996 | Nakagoshi |
| 5,940,454 A * | | 8/1999 | McNicol et al. ............... 375/347 |
| 6,029,057 A * | | 2/2000 | Paatelma et al. ........... 455/277.2 |
| 6,032,033 A | | 2/2000 | Morris et al. |
| 6,035,183 A * | | 3/2000 | Todd et al. ................. 455/226.2 |
| 6,360,088 B1 | | 3/2002 | Shi et al. |
| 6,947,716 B2 * | | 9/2005 | Ono ............................... 455/273 |
| 6,961,545 B2 | | 11/2005 | Tehrani et al. |
| 7,295,528 B2 | | 11/2007 | Ibrahim et al. |
| 7,447,171 B2 * | | 11/2008 | Smallcomb et al. .......... 370/316 |
| 7,471,702 B2 * | | 12/2008 | Laroia et al. ................. 370/491 |
| 7,492,842 B2 * | | 2/2009 | Yen et al. ...................... 375/347 |
| 7,499,691 B1 | | 3/2009 | Dunn et al. |
| 7,502,592 B2 * | | 3/2009 | Yamamoto et al. .......... 455/63.1 |
| 7,546,404 B2 | | 6/2009 | Yeh et al. |
| 7,907,573 B2 | | 3/2011 | Lee et al. |
| 7,991,429 B2 | | 8/2011 | Chiu |
| 8,009,096 B2 | | 8/2011 | Harel et al. |
| 8,014,817 B2 | | 9/2011 | Suzuki et al. |
| 8,085,734 B2 | | 12/2011 | Faber |
| 8,144,821 B2 | | 3/2012 | Hutchison et al. |
| 8,159,399 B2 | | 4/2012 | Dorsey et al. |
| 8,213,344 B2 | | 7/2012 | Zhu et al. |
| 8,244,944 B1 | | 8/2012 | Wong et al. |
| 8,301,192 B2 | | 10/2012 | Kakitsu et al. |
| 8,417,205 B2 * | | 4/2013 | Tang et al. .................... 455/272 |
| 8,463,214 B2 * | | 6/2013 | Yen et al. ...................... 455/133 |
| 8,600,427 B2 | | 12/2013 | Ibrahim et al. |
| 8,615,270 B2 | | 12/2013 | Ibrahim et al. |
| 8,755,359 B2 | | 6/2014 | Faber |
| 2002/0086648 A1 | | 7/2002 | Wilhelmsson et al. |
| 2002/0118724 A1 | | 8/2002 | Kishimoto et al. |
| 2002/0126640 A1 | | 9/2002 | Komatsu |
| 2003/0032403 A1 * | | 2/2003 | Ono ............................... 455/273 |
| 2004/0029619 A1 | | 2/2004 | Liang et al. |
| 2004/0229650 A1 | | 11/2004 | Fitton et al. |
| 2005/0059431 A1 | | 3/2005 | Matsui et al. |
| 2005/0266903 A1 * | | 12/2005 | Masaki ...................... 455/575.7 |
| 2006/0073829 A1 | | 4/2006 | Cho et al. |
| 2006/0276132 A1 | | 12/2006 | Sheng-Fuh et al. |
| 2007/0010202 A1 * | | 1/2007 | Yamamoto et al. .......... 455/63.1 |
| 2007/0032255 A1 | | 2/2007 | Koo et al. |
| 2007/0066244 A1 | | 3/2007 | Kao et al. |
| 2007/0178839 A1 | | 8/2007 | Rezvani et al. |
| 2007/0238496 A1 | | 10/2007 | Chung et al. |
| 2008/0043671 A1 | | 2/2008 | Moon et al. |
| 2008/0102760 A1 | | 5/2008 | McConnell et al. |
| 2008/0123610 A1 | | 5/2008 | Desai et al. |
| 2008/0240280 A1 | | 10/2008 | Li |
| 2008/0311871 A1 | | 12/2008 | Qi et al. |
| 2008/0316913 A1 | | 12/2008 | Kim et al. |
| 2009/0124290 A1 | | 5/2009 | Tao et al. |
| 2009/0137206 A1 | | 5/2009 | Sherman et al. |
| 2009/0180451 A1 | | 7/2009 | Alpert et al. |
| 2009/0258622 A1 | | 10/2009 | Ruijter |
| 2009/0258627 A1 | | 10/2009 | Hanusch et al. |
| 2010/0022192 A1 | | 1/2010 | Knudsen et al. |
| 2010/0041355 A1 | | 2/2010 | Laroia et al. |
| 2010/0054210 A1 | | 3/2010 | Ostergren |
| 2010/0120466 A1 | | 5/2010 | Li |
| 2010/0172426 A1 | | 7/2010 | Chang |
| 2010/0184459 A1 | | 7/2010 | Mori |
| 2010/0215111 A1 | | 8/2010 | Filipovic et al. |
| 2010/0246725 A1 | | 9/2010 | Okuyama et al. |
| 2010/0296419 A1 | | 11/2010 | Kim et al. |
| 2011/0103442 A1 | | 5/2011 | Nakayauchi et al. |
| 2011/0250926 A1 | | 10/2011 | Wietfeldt et al. |
| 2011/0292786 A1 | | 12/2011 | Haessler et al. |
| 2012/0008510 A1 | | 1/2012 | Cai et al. |
| 2012/0027112 A1 | | 2/2012 | Jiang et al. |
| 2012/0115553 A1 | | 5/2012 | Mahe et al. |
| 2012/0142291 A1 | | 6/2012 | Rath et al. |
| 2012/0195224 A1 | | 8/2012 | Kazmi et al. |
| 2012/0202555 A1 | | 8/2012 | Bergman et al. |
| 2012/0207045 A1 | | 8/2012 | Pelletier et al. |
| 2012/0244895 A1 | | 9/2012 | Thomas et al. |
| 2012/0281553 A1 | | 11/2012 | Mujtaba et al. |
| 2012/0282982 A1 | | 11/2012 | Mujtaba et al. |
| 2012/0320803 A1 | | 12/2012 | Skarp |
| 2013/0005278 A1 | | 1/2013 | Black et al. |
| 2013/0017797 A1 | | 1/2013 | Ramasamy et al. |
| 2013/0023265 A1 | | 1/2013 | Swaminathan et al. |
| 2013/0033996 A1 | | 2/2013 | Song et al. |
| 2013/0035051 A1 | | 2/2013 | Mujtaba et al. |
| 2013/0040671 A1 | | 2/2013 | Zawaideh et al. |
| 2013/0267181 A1 | | 10/2013 | Ayatollahi et al. |
| 2013/0307727 A1 | | 11/2013 | He et al. |
| 2013/0308476 A1 | | 11/2013 | He et al. |
| 2013/0308477 A1 | | 11/2013 | He et al. |
| 2013/0308478 A1 | | 11/2013 | He et al. |
| 2013/0308554 A1 | | 11/2013 | Ngai et al. |
| 2013/0308561 A1 | | 11/2013 | He et al. |
| 2013/0308562 A1 | | 11/2013 | Matin et al. |
| 2013/0308608 A1 | | 11/2013 | Hu et al. |
| 2013/0309981 A1 | | 11/2013 | Ngai et al. |
| 2013/0310045 A1 | | 11/2013 | Yan et al. |
| 2013/0310109 A1 | | 11/2013 | Filipovic et al. |

FOREIGN PATENT DOCUMENTS

| | | |
|---|---|---|
| EP | 1432067 A2 | 6/2004 |
| EP | 1482658 A2 | 12/2004 |
| EP | 1650885 A2 | 4/2006 |
| EP | 2139125 A1 | 12/2009 |
| EP | 2234276 A2 | 9/2010 |
| WO | WO-9819402 A1 | 5/1998 |
| WO | WO-0159945 A1 | 8/2001 |
| WO | WO-0241517 A2 | 5/2002 |
| WO | WO-02082688 A1 | 10/2002 |

(56) References Cited

FOREIGN PATENT DOCUMENTS

| WO | WO-03007502 A1 | 1/2003 |
|---|---|---|
| WO | WO-2005039073 | 4/2005 |
| WO | 2007058494 A1 | 5/2007 |
| WO | WO-2009098614 A2 | 8/2009 |
| WO | 2010096710 A2 | 8/2010 |
| WO | 2011084715 A1 | 7/2011 |
| WO | 2011084717 A1 | 7/2011 |
| WO | 2012011077 A1 | 1/2012 |

OTHER PUBLICATIONS

Heath R W et al., "Multimode Antenna Selection for Spatial Multiplexing Systems With Linear Receivers", IEEE Transactions on Signal Processing, IEEE Service Center, New York, NY, US, vol. 53, No. 8, Aug. 1, 2005, pp. 3042-3056, XP011136488, ISSN: 1053-587X, DOI: DOI:10.1109/TSP.2005.851109.

International Search Report and Written Opinion—PCT/US2013/041893—ISA/EPO—Oct. 21, 2013.

* cited by examiner

ANTENNA SWITCH CONFIGURATION DEVICES, METHODS AND SYSTEMS

CROSS-REFERENCE TO RELATED APPLICATIONS & PRIORITY CLAIMS

The present Application for patent claims priority to and the benefit of US Provisional Application Numbers: (a) 61/649,704, filed 21 May 2012; (b) 61/716,582, filed 21 Oct. 2012; (c) 61/734,276, filed 6 Dec. 2012; (d) 61/737,715, filed 14 Dec. 2012; (e) 61/716,586, filed 21 Oct. 2012; (f) 61/716,599, filed 21 Oct. 2012; (g) 61/716,902, filed 22 Oct. 2012; and (h) 61/736,541, filed 12 Dec. 2012. All of said applications are assigned to the assignee hereof and are hereby expressly incorporated by reference herein as if fully set forth fully below in their entireties for all applicable purposes.

TECHNICAL FIELD

The technology discussed below relates generally to wireless communications, and more specifically to antenna selection for optimizing power transmit and receive levels.

BACKGROUND

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

Mobile devices may further simultaneously support communication using multiple radio access technologies (RATs). Different radio access technologies may be used to expand the scope of services offered by the communication such as by expanding the geographic region in which the device may operate, as a mobile device moves through different regions supporting different radio access technologies. Furthermore, different radio access technologies may be used to simultaneously allow a user to engage in a variety of different forms of wireless communication activities. However, a device may be equipped with multiple antennas while the radio access technologies it supports may not receive with two or more antennas or may not receive with two or more antennas all the time.

BRIEF SUMMARY OF SOME SAMPLE EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides a wireless communications apparatus. The wireless communications apparatus includes a plurality of antennas including a first antenna and a second antenna. The wireless communications apparatus further includes a plurality of receive and/or transmit circuits including a first receive or transmit circuit. The wireless communications apparatus further includes a controller configured to determine one or more performance characteristics associated with the first antenna, switch the first receive or transmit circuit from receiving or transmitting wireless communications via the first antenna to receive or transmit wireless communications via the second antenna, determine one or more performance characteristics associated with the second antenna after the switch, compare the performance characteristics associated with the first antenna to the performance characteristics associated with the second antenna, determine whether to maintain the switch of the first receive or transmit circuit to the second antenna or to switch the first receive or transmit circuit back to the first antenna based on the comparison of the performance characteristics associated with the first antenna and the second antenna, and determine a duration of time to maintain a connection between the selected antenna and the receive or transmit circuit based, at least, on one or more performance characteristics.

Another aspect of the subject matter described in the disclosure provides an implementation of a method of wireless communications. The method includes determining one or more performance characteristics associated with a first antenna. The method further includes switching a first receive or transmit circuit from receiving or transmitting wireless communications via the first antenna to receiving or transmitting wireless communications via a second antenna. The method further includes determining one or more performance characteristics associated with the second antenna after the switch. The method further includes comparing the performance characteristics associated with the first antenna to the performance characteristics associated with the second antenna. The method further includes determining whether to maintain the switch of the first receive or transmit circuit to the second antenna or to switch the first receive or transmit circuit back to the first antenna based on the comparison of the performance characteristics associated with the first antenna and the second antenna. The method further includes determining a duration of time to maintain a connection between the selected antenna and the receive or transmit circuit based, at least, on one or more performance characteristics.

Yet another aspect of the subject matter described in the disclosure provides a wireless communications apparatus. The wireless communications apparatus includes means for receiving or transmitting wireless communications using at least either a first antenna or a second antenna. The wireless communications apparatus further includes means for determining one or more performance characteristics associated with the first antenna. The wireless communications apparatus further includes means for switching the means for receiving or transmitting wireless communications from receiving or transmitting wireless communications via the first antenna to receiving or transmitting wireless communications via the second antenna. The wireless communications apparatus further includes means for determining one or more performance characteristics associated with the second antenna after the switch. The wireless communications apparatus further includes means for comparing one or more performance characteristics associated with the first antenna to one or more performance characteristics associated with the second antenna. The wireless communications apparatus further includes means for determining based at least in part on results obtained from the means for comparing whether to maintain a switch of the means for receiving or transmitting to receiving or transmitting via the second antenna or whether to switch the means for receiving or transmitting back to receiving or transmitting via the first antenna. The wireless communications apparatus further includes means for determining a duration of time to maintain a connection between the selected antenna and the means for receiving or transmitting based, at least, on one or more performance characteristics.

Another aspect of the subject matter described in the disclosure provides a computer program product. The computer program product includes a computer readable storage medium. The computer readable storage medium includes code for determining one or more performance characteristics associated with a first antenna. The computer readable storage medium further includes code for switching a receive or transmit circuit from receiving wireless communications via the first antenna to receiving or transmitting wireless communications via a second antenna. The computer readable storage medium further includes code for determining one or more performance characteristics associated with the second antenna. The computer readable storage medium further includes code for comparing one or more performance characteristics associated with the first antenna to one or more performance characteristics associated with the second antenna. The computer readable storage medium further includes code for determining based at least in part on results obtained from the code for comparing whether to maintain a switch of the receive or transmit circuit to receiving or transmitting via the second antenna or whether to switch the receive or transmit circuit back to receiving or transmitting via the first antenna. The computer readable storage medium further includes code for determining a duration of time to maintain a connection between the selected antenna and the receive or transmit circuit based, at least, on one or more performance characteristics.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
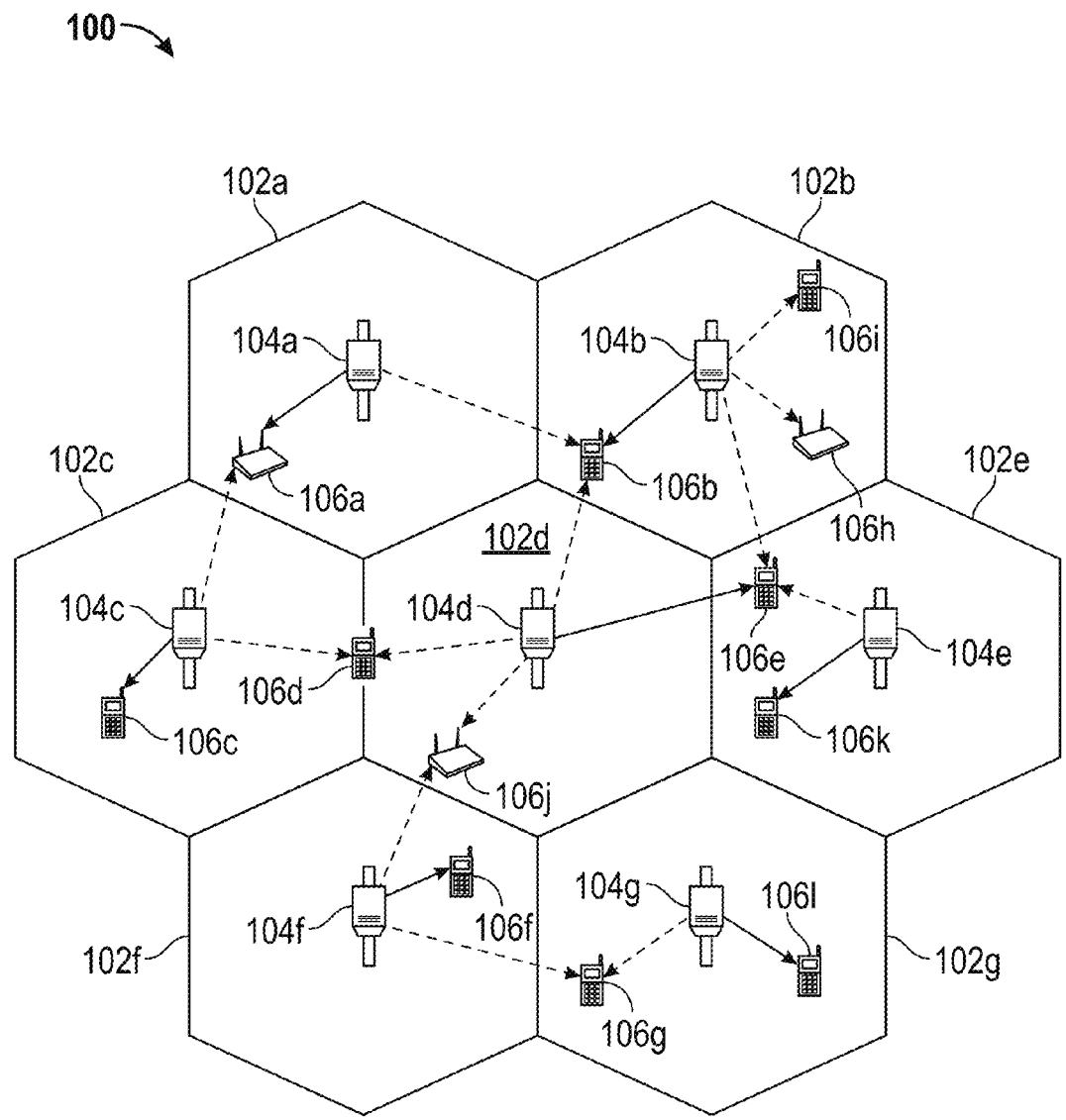
FIG. 1 shows an example of a simplified diagram of a wireless communication system in accordance with some embodiments.

Various aspects of embodiments within the scope of the appended claims are described below. It should be apparent that the aspects described herein may be implemented in a wide variety of forms and that any specific structure and/or function described herein is merely illustrative. Based on the present disclosure a person/one having ordinary skill in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

The word "exemplary" is used herein to mean "serving as an example, instance, or illustration." Any embodiment described herein as "exemplary" is not necessarily to be construed as preferred or advantageous over other embodiments. The following description is presented to enable any person skilled in the art to make and use the invention. Details are set forth in the following description for purpose of explanation. It should be appreciated that one of ordinary skill in the art would realize that the invention may be practiced without the use of these specific details. In other instances, well known structures and processes are not elaborated in order not to obscure the description of the invention with unnecessary details. Thus, the present invention is not intended to be limited by the embodiments shown, but is to be accorded with the widest scope consistent with the principles and features disclosed herein. Additionally, the word "or" is used herein inclusively, not exclusively, and use of the phrase "and/or" herein does not imply an exclusive use of "or."

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (WCDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 and EV-DO are described in documents from an organization named "3rd Generation Partnership Project 2" (3GPP2). These various radio technologies and standards are known in the art.

The techniques described herein may further be used with various modes associated with different radio access technologies such as simultaneous voice and data modes that allow simultaneously sending and receiving voice and non-voice data. For example, Simultaneous 1X Voice and EV-DO Data (SVDO) and Simultaneous 1X and LTE (SVLTE) modes may be employed in various embodiments.

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

FIG. 1 illustrates an exemplary wireless communication network 100 in accordance with some embodiments. The wireless communication network 100 is configured to support communication between a number of users. The wireless communication network 100 may be divided into one or more cells 102, such as, for example, cells 102a-102g. Communication coverage in cells 102a-102g may be provided by one or more nodes 104 (e.g., base stations), such as, for example, nodes 104a-104g. Each node 104 may provide communication coverage to a corresponding cell 102. The nodes 104 may interact with a plurality of access terminals (ATs), such as, for example, ATs 106a-106l. For ease of reference, ATs 106a-106l may be referred to hereinafter as an access terminal 106.

Each AT 106 may communicate with one or more nodes 104 on a forward link (FL) and/or a reverse link (RL) at a given moment. A FL is a communication link from a node to an AT. A RL is a communication link from an AT to a node. The FL may also be referred to as the downlink. Further, the RL may also be referred to as the uplink. The nodes 104 may be interconnected, for example, by appropriate wired or wireless interfaces and may be able to communicate with each other. Accordingly, each AT 106 may communicate with another AT 106 through one or more nodes 104.

The wireless communication network 100 may provide service over a large geographic region. For example, the cells 102a-102g may cover only a few blocks within a neighborhood or several square miles in a rural environment. In one embodiment, each cell may be further divided into one or more sectors (not shown).

As described above, a node 104 may provide an access terminal (AT) 106 access within its coverage area to another communications network, such as, for example the internet or another cellular network.

An AT 106 may be a wireless communication device (e.g., a mobile phone, router, personal computer, server, etc.) used by a user to send and receive voice or data over a communications network. An access terminal (AT) 106 may also be referred to herein as a user equipment (UE), as a mobile station (MS), or as a terminal device. As shown, ATs 106a, 106h, and 106j comprise routers. ATs 106b-106g, 106i, 106k, and 106l comprise mobile phones. However, each of ATs 106a-106l may comprise any suitable communication device.

An access terminal 106 may be multimode, capable of operating using different radio access technologies (RATs) such as radio access technologies defined by standards such as cdma2000 1x, 1x-EV-DO, LTE, eHRPD, 802.11, and the like. An access terminal 106 may perform a plurality of tasks across various communication systems using different radio access technologies. The communication may be accomplished using a plurality of collocated transmitters or may be communicated using one single transmitter.

Figure 2:
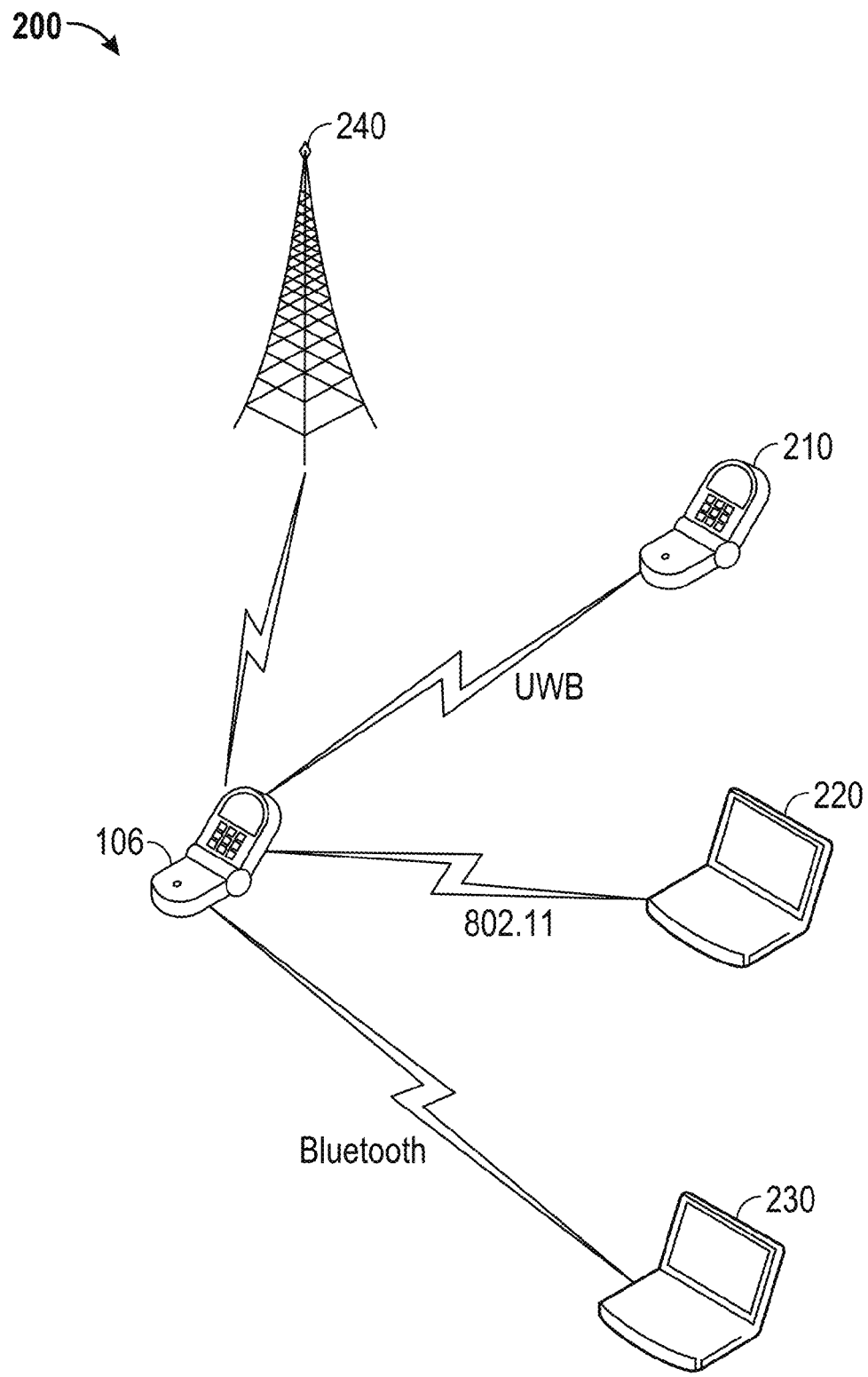
FIG. 2 shows an example of a functional block diagram of an exemplary mobile device operating in a wireless communication network in accordance with some embodiments.

FIG. 2 shows an example of a functional block diagram of an exemplary access terminal 106 operating in a wireless communication network 200 in accordance with some embodiments. The wireless communication network 200 comprises the access terminal 106, a second wireless communications device 210, a third wireless communications device 220, a fourth wireless communications device 230, and a cellular tower 240. The wireless communication network 200 may be configured to support communication between a multitude of devices, such as the wireless communications devices 106a, 210, 220, 230, and tower 240. The mobile wireless communications devices (e.g., 106a, 210, and 220) may comprise, for example, personal computers, PDAs, music players, video players, multimedia players, televisions, electronic game systems, digital cameras, video camcorders, watches, remote controls, headsets, and so on. Access terminal 106 may be simultaneously in communication with each of devices 210, 220, 230, and 240 via one or more transmitters collocated on access terminal 106.

With continuing reference to FIG. 2, the access terminal 106 may communicate with other wireless communications devices (e.g., 210, 220) over a variety of communication channels. The communication channels may comprise Ultra-Wide Band (UWB) channels, Bluetooth channels, 802.11 channels (e.g., 802.11a, 802.11b, 802.11g, and 802.11n), infrared (IR) channels, ZigBee (802.15) channels, or a variety of other channels, as is well known in the art. In one embodiment, the channel may be a UWB channel conforming to the ECMA-368 standard. Other channels would be readily recognized as possible as well.

The wireless communications network 200 may comprise a wireless local area network (WLAN) covering a physical area, like a home, office, or a group of buildings. A WLAN may use standards such as, 802.11 standard (e.g., 802.11g), and/or other standards for wireless communications. A WLAN may use peer-to-peer communication in which the wireless communication devices directly communicate with each other. The wireless communications network 200 may also comprise a wireless personal area network (WPAN), spanning, for example, an area of a few meters. A WPAN may use standards such as infrared, Bluetooth, a WiMedia based UWB standard (e.g., ECMA-368), and ZigBee standards, and/or other standards for wireless communications. A WPAN may use peer-to-peer communication in which the wireless communication devices directly communicate with each other. The wireless communications network 200 may also comprise a wide wireless area network (WWAN). The WWAN may use standards such as cdma2000 1x, 1x-EV-DO, LTE, eHRPD and the like. The access terminal 106 may connect to another network, such as a wireless communications network or the Internet, through network 200. The messages sent across the wireless communications network 200 may comprise information related to various types of communication (e.g., voice, data, multimedia services, etc.) and may be of varied degrees of importance to the user of access terminal 106, as described in greater detail below.

Although the following embodiments may refer to FIG. 1 or 2, one will recognize that they are readily applicable to other communication standards. For example, one embodiment may be applicable in a UMTS communication system. Some embodiments may be applicable in an OFDMA communication system. The communication system 200 may further comprise any type of communication system including, but not limited to, a code division multiple access (CDMA) system, a global system for mobile communication system (GSM), a wideband code division multiple access (WCDMA), and an OFDM system.

Figure 3:
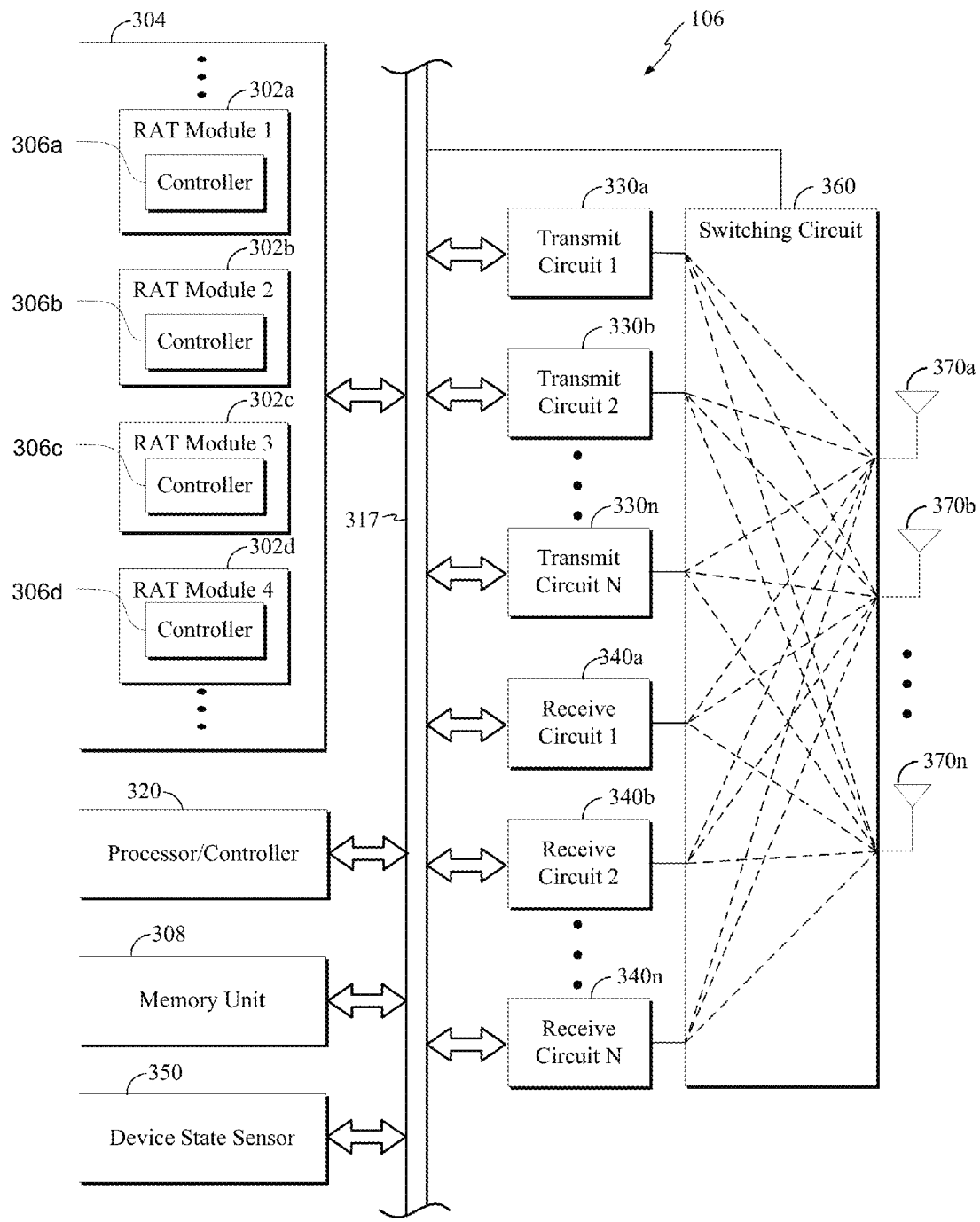
FIG. 3 shows an example of a functional block diagram of an exemplary access terminal shown in FIGS. 1 and 2 in accordance with some embodiments.

FIG. 3 shows an example of a functional block diagram of an exemplary access terminal 106 shown in FIGS. 1 and 2 in accordance with some embodiments. The access terminal 106 may be multimode, capable of operating using different radio access technologies (RATs) such as any of the radio technologies mentioned above with reference to FIGS. 1 and 2. The access terminal 106 is an example of a device that may be configured to implement the various methods described herein. The access terminal 106 may implement any of the devices illustrated in FIGS. 1-2.

The access terminal 106 may include a central data bus 317 linking several circuits together. The circuits include a controller/processor 320, a memory unit 308, and RAT circuitry 304 which may include various radio access technology modules such as modules 302a, 302b, 302c, and 302d. The processor/controller 320 may comprise or be a component of a processing system implemented with one or more processors. The processor/controller 320 may be configured as or referred to as an application processor 320 in some embodiments. Persons of skill in the art will understand that the embodiments described herein may be accomplished with one or more controllers instead of, or in addition to, controller 320, such as controller 306. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In addition, the processor/controller 320 may be configured to communicate with and control the operation of various modules configured for different radio access technologies (RATs). Each of modules 302a, 302b, 302c, and 302d may implement a specific radio access technology and may each individually include additional memory modules, communication components and functions which are applicable to the radio access technology type implemented by the module. Each module 302a, 302b, 302c, and 302d may further include a controller 306a, 306b, 306c, and 306d which may each also be referred to herein as a modem processor 306a, 306b, 306c, and 306d that may be used to control the operation of each RAT. For ease of reference, controllers 306a, 306b, 306c, and 306d may hereinafter be referred to as a RAT controller 306. Furthermore RAT controllers 306a, 306b, 306c, and 306d may be provided independently of each module 302a, 302b, 302c, and 302d for controlling the modules. In some embodiments, the processor 320 may be configured to perform the functions of the RAT controller 306. Furthermore, each RAT may include its own transceiver(s) including antenna(s) (not shown). The RAT modules may implement any of the RAT types discussed above with reference to FIGS. 1-2 or other readily recognizable RAT types.

The access terminal 106 further comprises one or more transmit circuits 330a, 330b, and 330n. Transmit circuits 330a, 330b, and 330n may also be referred to as transmit chains having one or more components configured to transmit wireless communications via an antenna 370a. For example, transmit circuit 330a may include a modulator (not shown), a digital-to-analog (D/A) converter (not shown), an amplifier (not shown) as well as other circuitry for modulating and preparing a wireless communications signal for transmission via an antenna 370a. In some cases, the RAT circuitry 304 may include transmit circuits 330a, 330b, and 330n where each RAT module 302a, 302b, 302c, and 302d may include one of transmit circuits 330a, 330b, and 330n. As such, transmit circuits 330a, 330b, and 330n may be configured to transmit according to a radio access technology associated with one of RAT modules 302a, 302b, 302c, and 302d. In some cases, the access terminal 106 may have one transmit circuit 330a. In other cases, one or more of transmit circuits 330a, 330b, and 330n may be activated or deactivated. In one aspect, the transmit circuits 330a may include components particular to one of the RAT modules 302a, 302b, 302c, and 302d. For example, a RAT module 302a may implement a wireless communications using OFDM, while a second RAT module 302b may implement a wireless communications using CDMA. As such, one transmit circuit 330a may include components configured for OFDM communications while a second transmit circuit 330b may include components configured CDMA communications.

The access terminal 106 further comprises one or more receive circuits 340a, 340b, and 340n. Receive circuits 340a, 340b, and 340n may also be referred to as receive chains having one or more components configured to receive wireless communications via an antenna 370a. For example, receive circuit 340a may include an amplifier (not shown), an analog-to-digital converter (not shown), a demodulator (not shown), as well as other circuitry for receiving and demodulating a wireless communications signal received via an antenna 370a. In some cases, the RAT circuitry 304 may include receive circuits 340a, 340b, and 340n where each RAT module 302a, 302b, 302c, and 302 may include one of receive circuits 340a, 340b, and 340n. As such, each of receive circuits 340a, 340b, and 340n may be configured to receive according to a radio access technology associated with one of the RAT modules 302a, 302b, 302c, and 302d. In some cases, the access terminal 106 may have one receive circuit 340a. In other cases one or more of the receive circuits 340a, 340b, and 340n may be activated or deactivated.

Transmit circuits 330a, 330b, and 330n may process and convert base-band signals to high-frequency (HF) signals. Receive circuits 340a, 340b, and 340n in turn may process and buffer received signals before sending out to the data bus 317. Transmit circuits 330a, 330b, and 330n may process and buffer the data from the data bus 317 before sending out of the access terminal 106.

Each of transmit circuits 330a, 330b, and 330n and receive circuits 340a, 340b, and 340n may be configured to respectively transmit and/or receive via one of several antennas 370a, 370b, and 370n. Individual transmit circuits 330a, 330b, and 330n and receive circuits 340a, 340b, and 340n may transmit and/or receive information associated with a different radio access technology via a particular antenna 370a, 370b, or 370n. For example, for simultaneous voice and data modes, one transmit circuit 330a may be used for transmitting voice data via antenna 370a while another transmit circuit 330b may be used for transmitting non-voice data via antenna 370b. Stated another way, a first transmit circuit 330a may be used for transmitting and/or receiving 1x voice data via antenna 370a while a second transmit circuit 330b may be used for data only (DO) LTE via antenna 370b. The processor/controller 320 directs the multiple transmit circuits 330a, 330b, and 330n and receive circuits 340a, 340b, and 340n for detecting and/or processing of signals from the different frequency bands via antennas 370a, 370b, and 370n. Antennas 370a, 370b, and 370n may be placed in different physical locations within the access terminal 106. For example, antennas 370a, 370b, and 370n may be at opposite (e.g., distal) ends or corners of the access terminal 106 or adjacent to each other. Generally, antennas 370a, 370b, and 370n can be located at similar or distinct places as desired or in accordance with device design.

A switching circuit 360 may be provided to allow a controller 320 to select antennas 370a, 370b, and 370n for which transmit circuits 330a, 330b, and 330n or receive circuits 340a, 340b, and 340n are configured to transmit and/or receive from. The switching circuit 360 may include circuitry configured to switch M inputs corresponding to transmit circuits 330a, 330b, and 330n and receive circuits 340a, 340b, and 340n to N outputs corresponding to antennas 370a, 370b, and 370n. As shown in FIG. 3, there may be more or less than three transmit circuits 330a, 330b, and 330n, three receive circuits 340a, 340b, and 340n, and three antennas 370a, 370b, and 370n. As one example, the switching circuit 360 may be configured as a crossbar switch or other suitable switching circuitry. The controller 320 may be configured to switch transmit circuits 330a, 330b, and 330n and/or receive circuits 340a, 340b, and 340n to respectively transmit and receive via any combination of antennas 370a, 370b, and 370n.

In some embodiments, transmit circuits 330a, 330b, and 330n and/or receive circuits 340a, 340b, and 340n can be implemented as an external circuit pluggable to the access terminal 106.

The processor/controller 320 may perform the function of data management of the data bus 317 and the function of general data processing, including executing the instructional contents of the memory unit 308. The memory unit 308 may include a set of modules and/or instructions. Instructions particular to the process steps of the access terminal 106 as shown and described in the embodiments described below can be coded in the various functions included in the contents of the memory unit 308. In one embodiment, the memory unit 308 is a RAM (Random Access Memory) circuit. Some communication device functions, such as the handoff functions, are software routines, modules, and/or data sets. The memory unit 308 can be tied to another memory circuit (not shown) which either can be of the volatile or nonvolatile type. As an alternative, the memory unit 308 can be made of other circuit types, such as an EEPROM (Electrically Erasable Programmable Read Only Memory), an EPROM (Electrical Programmable Read Only Memory), a ROM (Read Only Memory), an ASIC (Application Specific Integrated Circuit), a magnetic disk, an optical disk, and others well known in the art. In addition, the memory unit 308 can be a combination of ASIC and memory circuitry of the volatile type and/or non-volatile type.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, modules, units, blocks, and the like, such as shown and described in FIG. 3.

Although described separately, it is to be appreciated that functional blocks described with respect to the access terminal 106 need not be separate structural elements. For example, the processor 320, the memory unit 308, and RAT modules 302a, 302b, 302c, and 302d may be embodied on a single chip. The processor 320 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Figure 4:
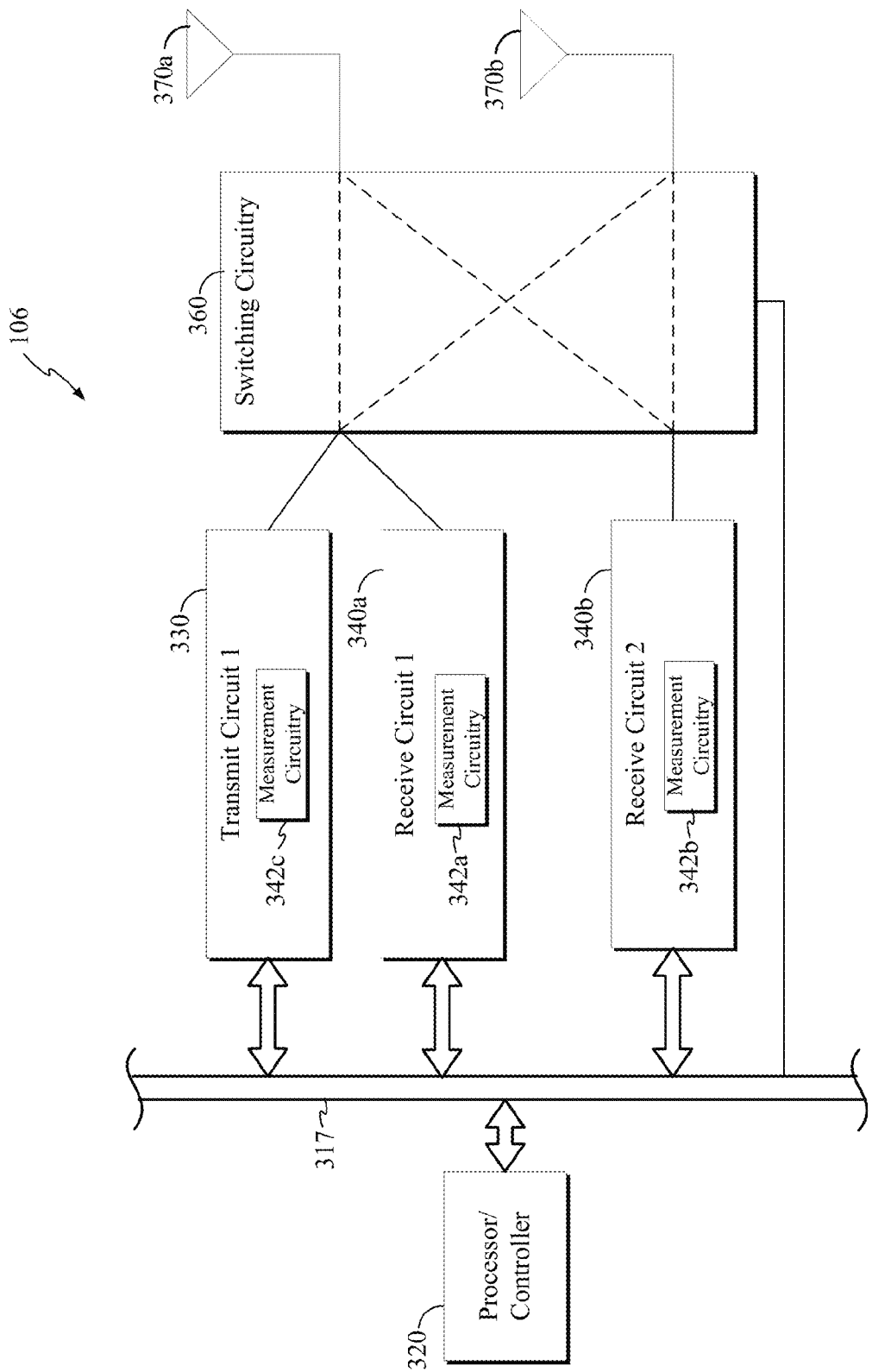
FIG. 4 is a functional block diagram of a portion of the access terminal shown in FIG. 3 in accordance with some embodiments.

FIG. 4 is a functional block diagram of a portion of the access terminal 106 shown in FIG. 3 in accordance with some embodiments. With reference to FIG. 4, in some cases, only one transmit circuit 330 may be active. In other words, the access terminal 106 may be in a mode configured for using a single transmit circuit 330. In some cases, this mode may correspond to a single RAT module 302a, 302b, 302c, and 302d being active. As shown in FIG. 4, the controller 320 may be configured to switch the transmit circuit 330 to communicate via either a first antenna 370a or a second antenna 370b. In addition, a receive circuit 340a may be associated with the transmit circuit 330 in that the receive circuit 340a is configured to communicate via the same antenna 370a or 370b used by the transmit circuit 330. As such, the controller 320 may be configured to switch the transmit circuit 330 and receive circuit 340a to respectively transmit and receive via the first antenna 370a or the second antenna 370b. Stated another way, the first receive circuit 340a is configured to be switched alongside the transmit circuit 330. In addition, a second receive circuit 340b may be configured to communicate via either the antenna 370a or 370b that is not being used for the transmit circuit 330 and the first receive circuit 340a. The first receive circuit 340a and second receive circuit 340b may include measurement circuitry 342a and 342b configured to measure receive power levels, and first transmit circuit 330 may include measurement circuitry 342c. As one example, the measurement circuitry 342a and 342b may be configured to gather receive automatic gain control (AGC) measurements.

As described above, multiple transmit circuits 330a, 330b, and 330c may simultaneously transmit using multiple antennas 370a, 370b, and 370n. However, the performance of one antenna 370b may be better than another antenna 370b based on any one of a number of factors that may be related to, but not limited to, the arrangements of the antennas on the access terminal 106, the proximity of external objects to the antennas 370a, 370b, and 370c, or inherent antenna characteristics. Furthermore, during operation, certain transmit circuits 330a, 330b, and 330c may have different data transmission priorities or transmit power preferences. Certain aspects of various embodiments described herein are directed to switching transmit circuits 330a, 330b, and 330c for transmitting via different antennas 370a, 370b, and 370n to improve performance of an access terminal 106. For example, it may be desirable for the transmit circuit 330a transmitting the highest priority data to transmit via the antenna 370a having the best performance. In addition, other transmit circuit power requirements may result in improved performance if a transmit circuit 330a is coupled to the highest performing antenna 330b. As operation of the access terminal 106 may affect antenna performance, it may be desirable to have dynamic systems and methods for coupling transmit circuits 330a, 330b, and 330c to antennas 370a, 370b, and 370n as provided by embodiments described herein.

With reference to FIGS. 3 and 4, certain operating conditions may result in one or more of antennas 370a, 370b, and 370n being de-sensed or otherwise resulting in a reduced performance. For example, the hand of a user may be wrapped around the access terminal 106 effectively blocking one or more of antennas 370a, 370b, and 370n. Or the access terminal 106 may be positioned such that antennas 370a, 370b, and 370n may operate with less than ideal receive or transmit conditions. These scenarios may reduce power levels of received signals thus making it more difficult to receive and demodulate signals. Blocking one or more of antennas 370a, 370b, and 370n may also reduce the total signal strength such that transmit circuits 330a, 330b, and 330n may need to increase power levels. However, with respect to increased transmit power levels, an access terminal 106 may be subject to regulatory radio frequency (RF) safety requirements. The access terminal 106 may be required to operate within specific guidelines before entering the market. For example, devices operating near the human body are evaluated to determine the Specific Absorption Rate ("SAR") their electromagnetic waves produce. SAR is the time-rate of electromagnetic energy absorption per unit of mass in a lossy media, and may be expressed as:

$$SAR(r) = \frac{\sigma(r)}{\rho(r)} |E(r)|^2_{rms} \quad \text{(Equation 1)}$$

Where E(r) is the exogenous electric field at point r, while σ(r) and ρ(r) are the corresponding equivalent electrical conductivity and mass density, respectively. In one aspect, these safety guidelines may limit the amount of transmit power levels.

Generally, SAR testing evaluates the amount of energy absorbed into the body from such devices with a single or multiple transmitters. Under one requirement, devices operating at distances beyond 20 cm may be evaluated through a maximum permissible exposure ("MPE") calculation or measurement. As such, when an one or more antennas 370a, 370b, and 370n are blocked by a human hand or other body part, the maximum transmit power level allowed to avoid exceeding SAR limits may be significantly reduced.

Other operating conditions depending on the position of the access terminal 106 with respect to a user or other objects may further reduce performance due to antenna blocking. In addition, certain operating modes (e.g., using an access terminal 106 as a hotspot) may require increased power levels which may further impact regulatory limits.

To account for the various operating conditions in addition to other factors, certain aspects of certain embodiments described herein are directed to comparing performance characteristics associated with different antennas with one antenna at a time in order to optimize access terminal 106 performance when using radio access technologies that receive or transmit with only one antenna at least some of the time. In one embodiment, this may mitigate hand/body blocking and allow for selecting antennas in such a way to meet regulatory limits at the least cost to performance and/or to enable good receive conditions. Further, in one advantageous aspect, receive antenna diversity is not required.

Accordingly, various methods are described herein for comparing performance characteristics associated with different antennas with one antenna at a time. In some embodiments, the performance characteristics include downlink performance metrics, such as receive or transmit power level. In some aspects, controller/processor 320 may be configured to determine the performance characteristics associated with the antennas 370a, 370b, and 370n based on the receive power levels of the antennas as detected by the receive circuits 340a, 340b, and 340n. In one aspect, receive power levels may be obtained using receive automatic gain control (AGC) measurements from the receive circuits 340a, 340b, and 340n. Various performance metrics the controller may determine include, but are not limited to, Edo, RSSI, RSCP, RSRP, BLER, BER, throughput, missed page indicator, transmit (Tx) power level, and Tx power level headroom. These performance metrics are not necessarily based on an antenna's receive or transmit power levels. One of skill in the art will understand that other performance characteristics and techniques for determining performance characteristics may be used herein. Based on the measured performance characteristics, the controller may cause the switching circuit 360 to switch the receive circuits 340a, 340b, and 340c and/or transmit circuits 330a, 330b, and 330c for receiving and/or transmitting to different antennas 370a, 370b, and 370n to improve performance of the access terminal 106. For example, it may be desirable for the receive circuit 340a and/or the transmit circuit 330a receiving and transmitting the highest priority data to transmit via the antenna 370b having the best performance. In addition, other transmit circuit power requirements may result in improved performance if a receive circuit 340a and/or transmit circuit 330a is coupled to the best performing antenna 370b.

In some embodiments, the controller 320 may have the switching circuit 360 connect a receive circuit 340a and/or transmit circuit 330a to first antenna 370a then subsequently disconnect circuit 340a and/or circuit 330a from the first antenna 370a and connect the receive circuit 340a and/or transmit circuit 330a to second antenna 370b. The processor/controller 320 may monitor performance characteristics associated with the first antenna 370a and the second antenna 370b when each is respectively connected to receive circuit 340a and/or transmit circuit 330a. The processor/controller 320 may then compare the performance characteristics associated with first antenna 370a and second antenna 370b. Depending on the performance characteristics comparison, the controller may have the switching circuit 360 maintain the antenna switch configuration connecting second antenna 370b to receive circuit 340a and/or transmit circuit 330a, or the controller 320 may have the switching circuit undo the change of antenna switch configuration and reconnect first antenna 370a to receive circuit 340a and/or transmit circuit 330a. Accordingly, a comparison of the performance characteristics associated with multiple antennas can be made with one antenna at a time, and thereby allow RATs that may not receive with two or more antennas, or may not receive with two or more antennas all the time, to utilize an antenna associated with more beneficial performance characteristics than another antenna. Examples of such RATs may include GSM/EDGE, 1x/DO, WCDMA, TDSCDMA, TDD-LTE, and/or FDD-LTE. Persons of ordinary skill in the art will recognize that the embodiments described herein may be used in conjunction with other RATs, however. Advantageously, these embodiments do not require receiver diversity.

Figure 5:
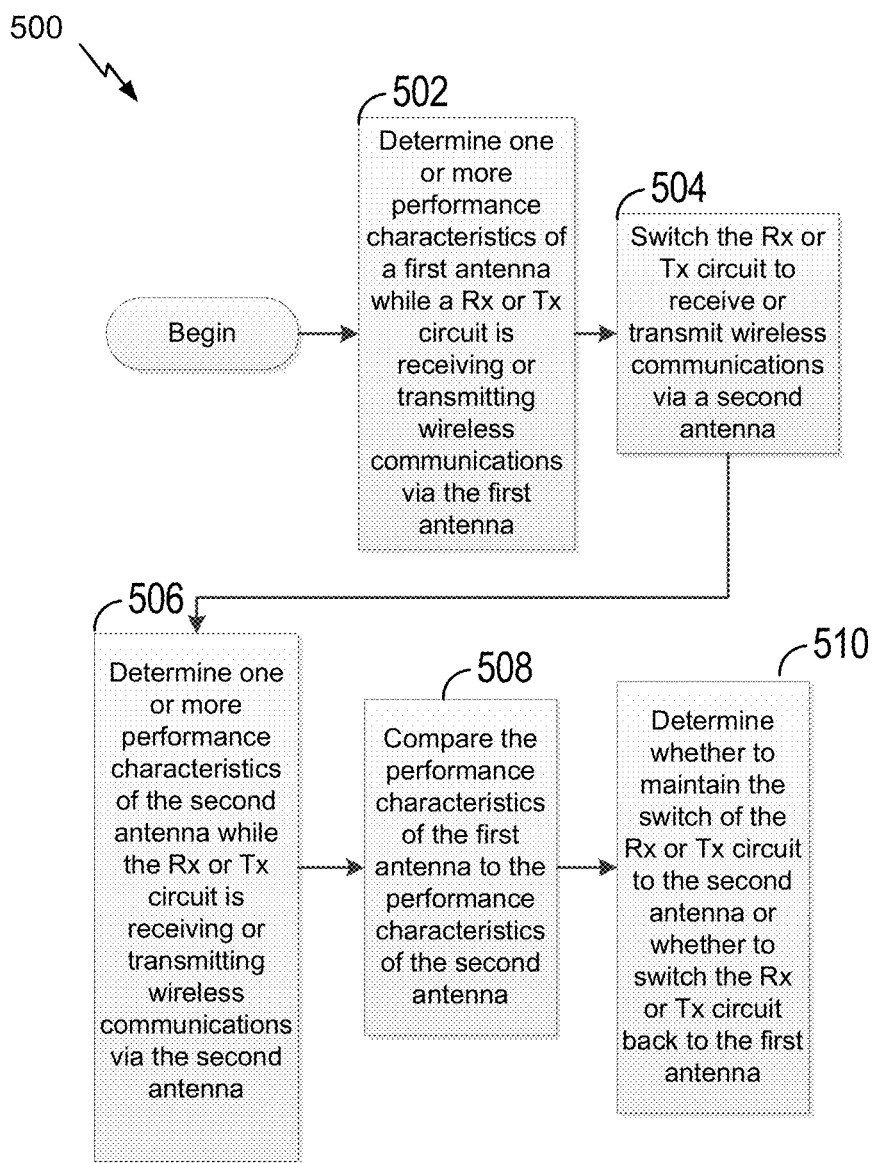
FIG. 5 is a flowchart of an implementation of an exemplary method for comparing performance characteristics associated with different antennas with one antenna at a time in accordance with some embodiments.

FIG. 5 shows a flowchart of an implementation of an exemplary method 500 for comparing performance characteristics associated with different antennas with one antenna at a time in accordance with some embodiments. The method 500 may be implemented at a wireless communication apparatus implemented as an access terminal 106, for example. Although the method 500 is described below with respect to elements of the access terminal 106, those having ordinary skill in the art will appreciate that other components may be used to implement one or more of the blocks described herein.

At block 502, one or more performance characteristics associated with a first antenna 370a are determined while a receive circuit 340a or transmit circuit 330a is receiving or transmitting wireless communications via the first antenna 370a. At block 504, the receive circuit 340a or transmit circuit 330a is switched to receive or transmit wireless communications via a second antenna 370b. In one aspect, a controller 320 may control switching circuitry 360 to perform switching. At block 506, one or more performance characteristics associated with the second antenna 370b are determined while a receive circuit 340a or transmit circuit 330a is receiving or transmitting wireless communications via the second antenna 370b. At block 508, the performance characteristics associated with the first antenna 370a are compared to the performance characteristics associated with the second antenna 370b. In one aspect, a processor/controller 320 may perform the comparison. At block 510, a determination is made whether the receive circuit 340a or transmit circuit 330a should remain switched to the second antenna 370b, or whether the receive circuit 340a or transmit circuit 330a should be switched back to the first antenna 370a. The determination performed at block 510 is based on the comparison of performance characteristics associated with the first antenna 370a and second antenna 370b.

Figure 6:
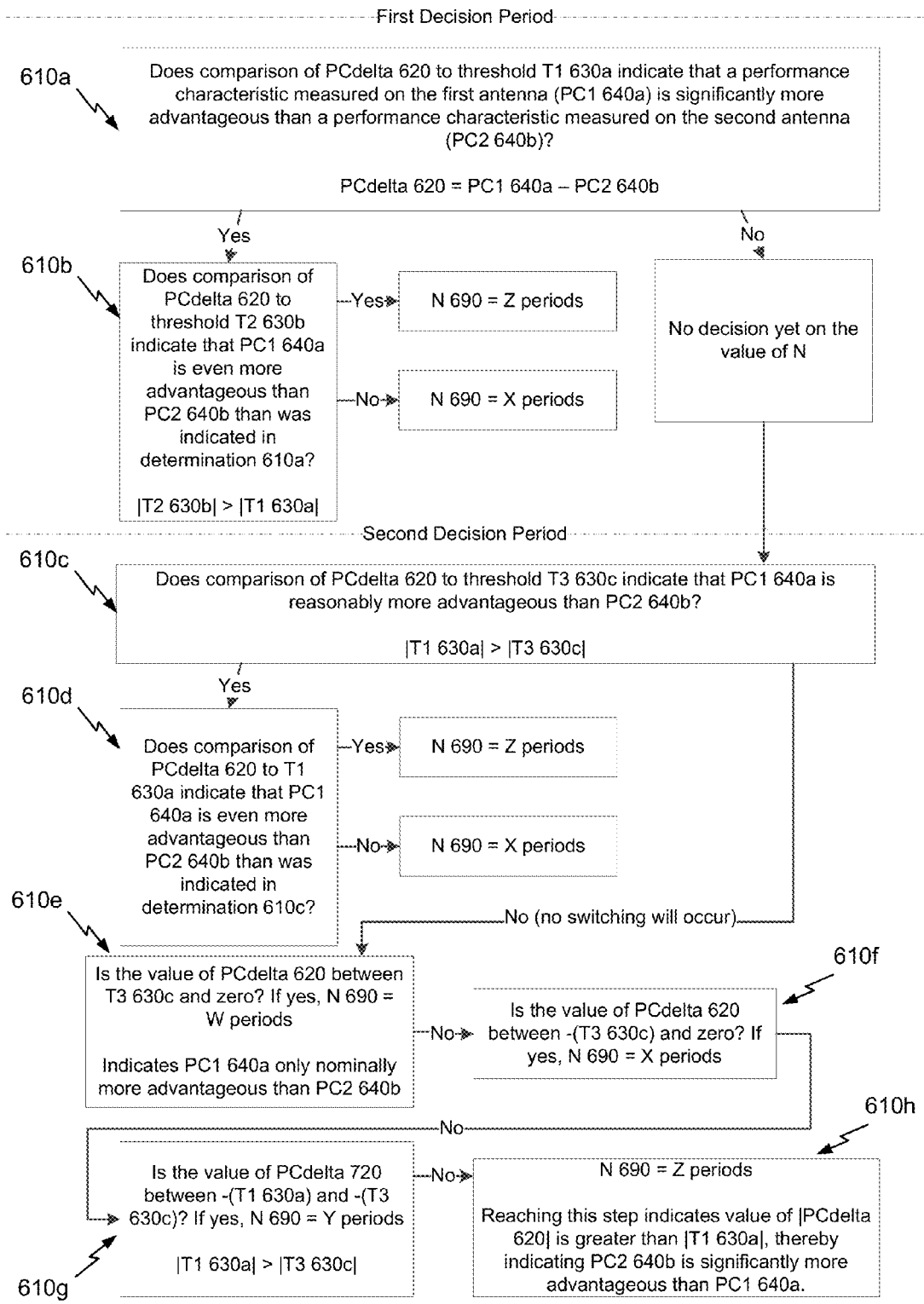
FIG. 6 shows another flowchart of an implementation of an exemplary method implemented by a wireless communication apparatus in accordance with some embodiments.

FIG. 6 shows a flowchart of an implementation of an exemplary method 600 for determining a duration of time a connection should be maintained between the antenna selected as a result of method 500 and a receive circuit 340a or transmit circuit 330a before method 500 is started again. In some embodiments, the method 600 is carried out after the method 500 reflected in FIG. 5. In other embodiments, some aspects of the method 500 may occur simultaneously with the method 600. The method 600 may be implemented at a wireless communication apparatus implemented as an access terminal 106, for example. Although the method 600 is described below with respect to elements of the access terminal 106, those having ordinary skill in the art will appreciate that other components may be used to implement one or more of the blocks described herein.

N 690 is the result of the method 600 and represents the length of time that the connection should be maintained between the antenna with preferable performance characteristics and the receive circuit 340a or the transmit circuit 330a. In some embodiments, once a value is assigned to N 690, the method 600 terminates. In one embodiment of the invention, N 690 is assigned a time value that is determined based on a difference (PCdelta 620) in a performance characteristic measured on the first antenna 370a before the switching of method 500 takes place (PC1 640a) and a performance characteristic measured on the second antenna 370b after the switching (PC2 640b). In other words, different time values can be assigned to N 690 in response to different values for PCdelta 620. In this embodiment, the method 600 advantageously utilizes dynamic time hysteresis in order to prevent unintended switching back and forth between the selected antenna and the unselected antenna. Without the use of such dynamic time hysteresis, unintended switching back and forth may occur when switching decisions are based solely on particular performance characteristics being outside of one or more thresholds.

Figure 7:
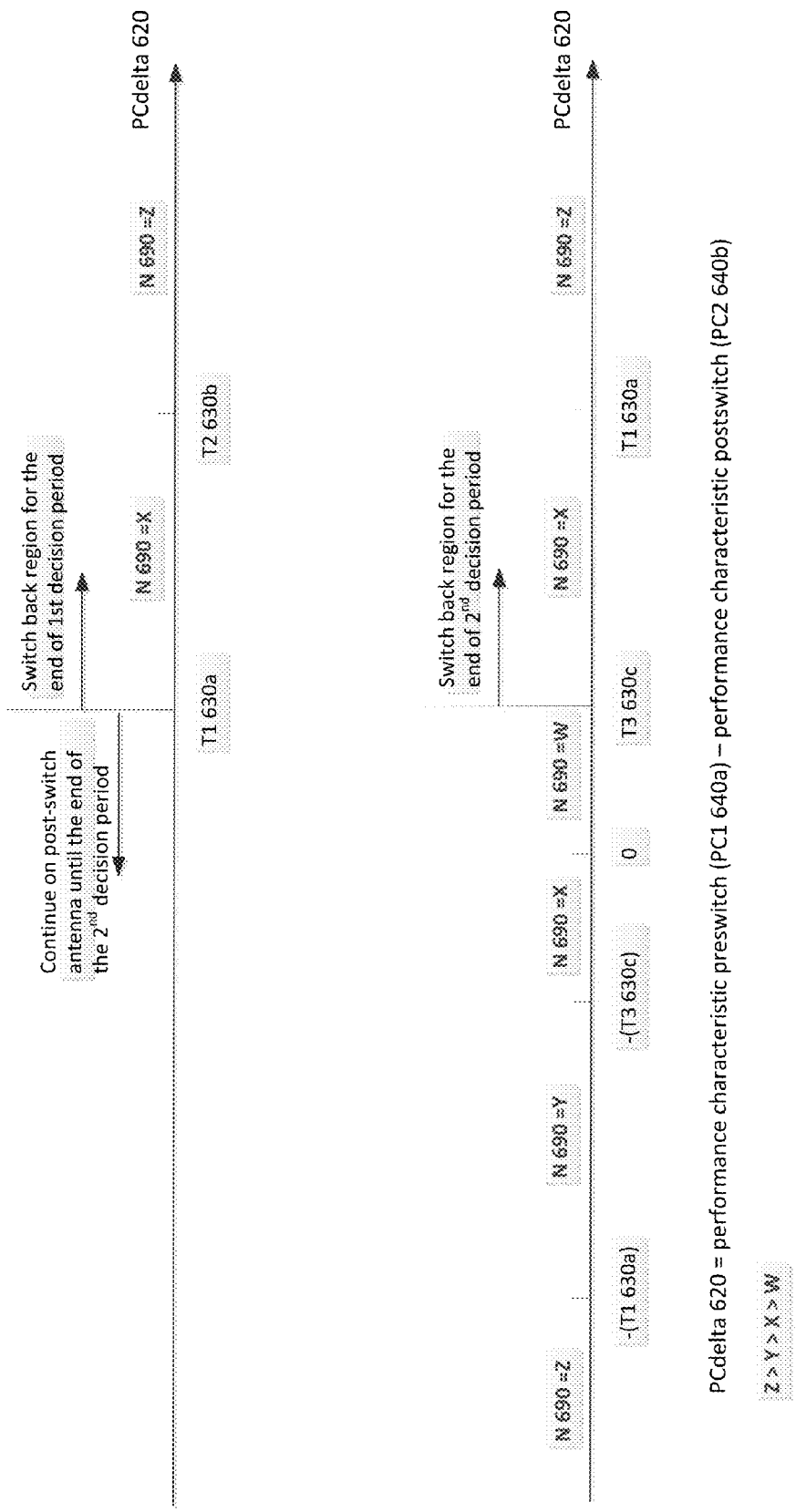
FIG. 7 shows a plot of possible results of the exemplary method demonstrated in FIG. 6 in accordance with some embodiments.
Figure 8:
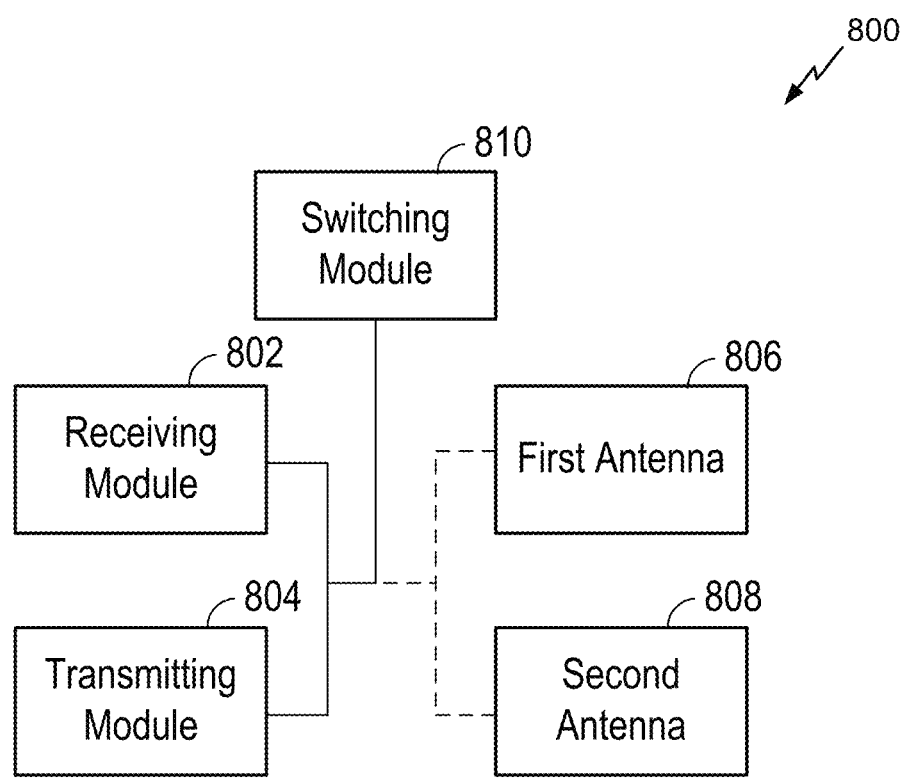
FIG. 8 is a functional block diagram of another exemplary wireless communication apparatus that may be employed within the wireless communication system in accordance with some embodiments.

N 690 is expressed in FIGS. 7-8 in terms of W, X, Y, and Z periods, with Z>Y>X>W. However, those having ordinary skill in the art will appreciate that N 690 can equal non-periodic units of time when implementing the method disclosed herein. Further, those having ordinary skill in the art will appreciate that the values used for N 690 in FIGS. 6-7 are only examples intended to show relative relationships between possible results of the method 600. As such, other values for N may be used when implementing the method 600.

The method 600 utilizes progressive determinations 610a-h to determine a value for N 690. Determinations 610a-h compare PCdelta 620 to various thresholds 610a-c in order to determine what value N 690 should be assigned. Those having ordinary skill in the art will appreciate additional thresholds can be used along with, or in place of, thresholds 610a-c. Those having ordinary skill in the art will also appreciate that the relationships between thresholds 610a-c described herein may be changed without deviating from the scope of the method described. Further, those having ordinary skill in the art will appreciate that the number of determinations made can be increased or decreased without deviating from the scope of the method described herein.

Referring to FIG. 6, the method 600 begins with determination step 610a. In some embodiments, step 610a is carried out during a first decision period. Step 610a involves comparing PCdelta 620 to a threshold, T1 630a, to determine whether PC1 640a is significantly more advantageous than PC2 640b. A value for threshold T1 630a is selected before the method 600 begins. A value for T1 630a is selected to ensure that a 'yes' determination from step 610a indicates that PC1 640a is significantly more advantageous than PC2 640b.

If step 610a indicates that PC1 640a is significantly more advantageous than PC2 640b, step 610b is carried out. Step 610b involves comparing PCdelta 620 to a threshold, T2 630b, to determine whether PC1 640a is even more advantageous than PC2 640b than was indicated in step 610a. A value for threshold T2 630b is selected before the method 600 begins. A value for T2 630b is selected to ensure that a 'yes' determination from step 610b indicates that PC1 640a is even more advantageous than PC2 640b than was indicated in step 610a. In some embodiments, a value is selected for T2 630b that has a greater magnitude than the value of T1 630a. For example, T2 630b may have a value twice that of T1 630a. If step 610b indicates that PC1 640a is even more advantageous than PC2 640b than was indicated in step 610a, N 690 is assigned a value of Z periods. If step 610b indicates that PC1 640a is not more advantageous than PC2 640b than was indicated in step 610a, N 690 is assigned a value of X periods. In some embodiments, Z>X. For example, Z may be twice as great as X.

If step 610a does not indicate that PC1 640a is significantly more advantageous than PC2 640b, no decision is made on the value of N during the first decision period. Instead, the method 600 waits until a second decision period begins then carries out step 610c. PCdelta 620 may have a different value in the first decision period than it has during the second decision period due to a change in the performance characteristics being measured on the second antenna 370b and/or due to a combining of the performance characteristics measured during both the first decision period and the second decision period. In some embodiments, the value of PCdelta 620 during the second decision period is treated as having a higher confidence level.

Step 610c involves comparing PCdelta 620 to a threshold, T3 630c, to determine if PC1 640a is reasonably more advantageous than PC2 640b. A value for threshold T3 630c is selected before the method 600 begins. A value for T3 630c is selected to ensure that a 'yes' determination from step 610c indicates that PC1 640a is at least reasonably more advantageous than PC2 640b. In some embodiments, the value of T3 630c will be of less magnitude than the value of T1 630a. In these embodiments, step 610c can compare PCdelta 620 to a threshold of less magnitude than was used in step 610a because the value of PCdelta 620 has a higher confidence level in the second decision period than it did in the first decision period.

If step 610c determines that PC1 640a is at least reasonably more advantageous than PC2 640b, step 610d is carried out. Step 610d involves comparing PCdelta 620 to a threshold that is selected so as to help determine whether PC1 640a is even more advantageous than PC2 640b than was indicated in step 610c. In some embodiments, the threshold may be T1 630a, the same threshold that was used in step 610a. If step 610d determines that PC1 640a is even more advantageous than PC2 640b than was indicated in step 610c, N 690 will be assigned a value of Z periods. If step 610d determines that PC1 640a is not more advantageous than PC2 640b than is indicated in step 610c, N 690 will be assigned a value of X periods, where Z>X.

In some embodiments, if step 610c determines that PC1 640a is not at least reasonably more advantageous than PC2 640b, no switching back to the first antenna 370a will occur. In some embodiments, step 610e is then carried out. Step 610e involves determining whether PCdelta 620 has a value between T3 630c and zero. If so, this indicates that PC1 640a is only nominally more advantageous than PC2 640b, and N 690 is assigned a value of W periods, where W<x<Y<Z. In some embodiments not reflected in FIG. 6, if step 610e indicates that PC1 640a is only nominally more advantageous than PC2 640b, a switch back to the first antenna 370a will occur, although N 690 will still be assigned a value of W, where W<x<Y<Z.

If step 610e determines that PCdelta 620 does not have a value between T3 630c and zero, step 610f is then carried out. Step 610f involves determining whether PCdelta 620 has a value between −(T3 630c) and zero. If so, this indicates that PC2 640b is only nominally more advantageous than PC1 640a, and N 690 is assigned a value of X periods, where W<x<Y<Z. If step 610f determines that PCdelta 620 does not have a value between −(T3 630c) and zero, step 610g is then carried out.

Step 610g involves determining whether PCdelta 620 has a value between −(T1 630a) and −(T3 630c). If so, N 690 is assigned a value of Y periods, with W<x<Y<Z. If step 610g determines that PCdelta 620 does not have a value between −(T1 630a) and −(T3 630c), step 610h is then carried out. Step 610h involves determining whether PCdelta 620 has a greater magnitude than T1 630a. If so, this indicates that PC2 640b is significantly more advantageous than PC1 640a and N 690 is assigned a value of Z periods, where Z>Y>X>W.

In some embodiments, a received signal power code (RSCP) is a performance characteristic that lends itself to the method 600. In addition, in some embodiments progressive determinations 610a-h must be completed within a pre-defined time range after the switching of method 500 takes place as environmental changes may occur that render PC1 640a not to be reflective of the actual value of performance characteristics that can be measured on the first antenna 370a after the environmental changes occur. Further, in the examples provided, N 690 is known as a 'quiet period' as this is the period of time before method 500 is started again.

In some embodiments, although a connection is being maintained between the antenna selected by method 500 and a receive circuit 340a or transmit circuit 330a for the length of time N 690 as determined by method 600, additional events may cause a switch from the antenna selected by method 500 to the antenna not selected by method 500. For example, a switch may be triggered if a performance characteristic measured on the selected antenna drops below or rises above a threshold. Further, a switch may be triggered if there is a sudden change in a measured performance characteristic. A sudden change in a measured performance characteristic might occur when the selected antenna is blocked. This might occur when a user equipment is held differently, such as when the user rotates the device to watch a video in a landscape orientation. In addition, a switch may be triggered if a comparison of a performance characteristic measured on the selected antenna to a performance characteristic measured on a third antenna 370c indicates that the difference between the performance characteristic measured on the selected antenna and the performance characteristic measured on the third antenna is outside of a range it should normally be in. In one embodiment, a normal range may be determined based on an expected difference between a performance characteristic measured on the selected antenna and a performance characteristic measured on the third antenna.

FIG. 7 is a plot of possible results of the method 600 for different PCdelta 620 values. In one embodiment, the possible values for N 690 include values W, X, Y, and Z, wherein Z>Y>X>W. FIG. 7 demonstrates which of these values are assigned to N 690 for the various thresholds discussed in reference to FIG. 6.

FIG. 8 is a functional block diagram of another exemplary wireless communication apparatus 800 that may be employed within the wireless communication system 100 in accordance with some embodiments. Those skilled in the art will appreciate that a wireless communication device 800 may have more components, such as any one or more of the components shown in FIG. 3. The wireless communication device 800 shown includes only those components useful for describing some prominent features of certain embodiments. The device 800 includes a receiving module 802 and a transmitting module 804. In some cases, a means for receiving may include the receiving module 802. In some cases, a means for transmitting may include a transmitting module 804. The device 800 further includes a first antenna 806 and second antenna 808. The device 800 further includes a switching module 810. In some cases, a means for switching may include the switching module 810. The switching module may be a controller 320 and may include switching circuitry 360.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Figure 9:
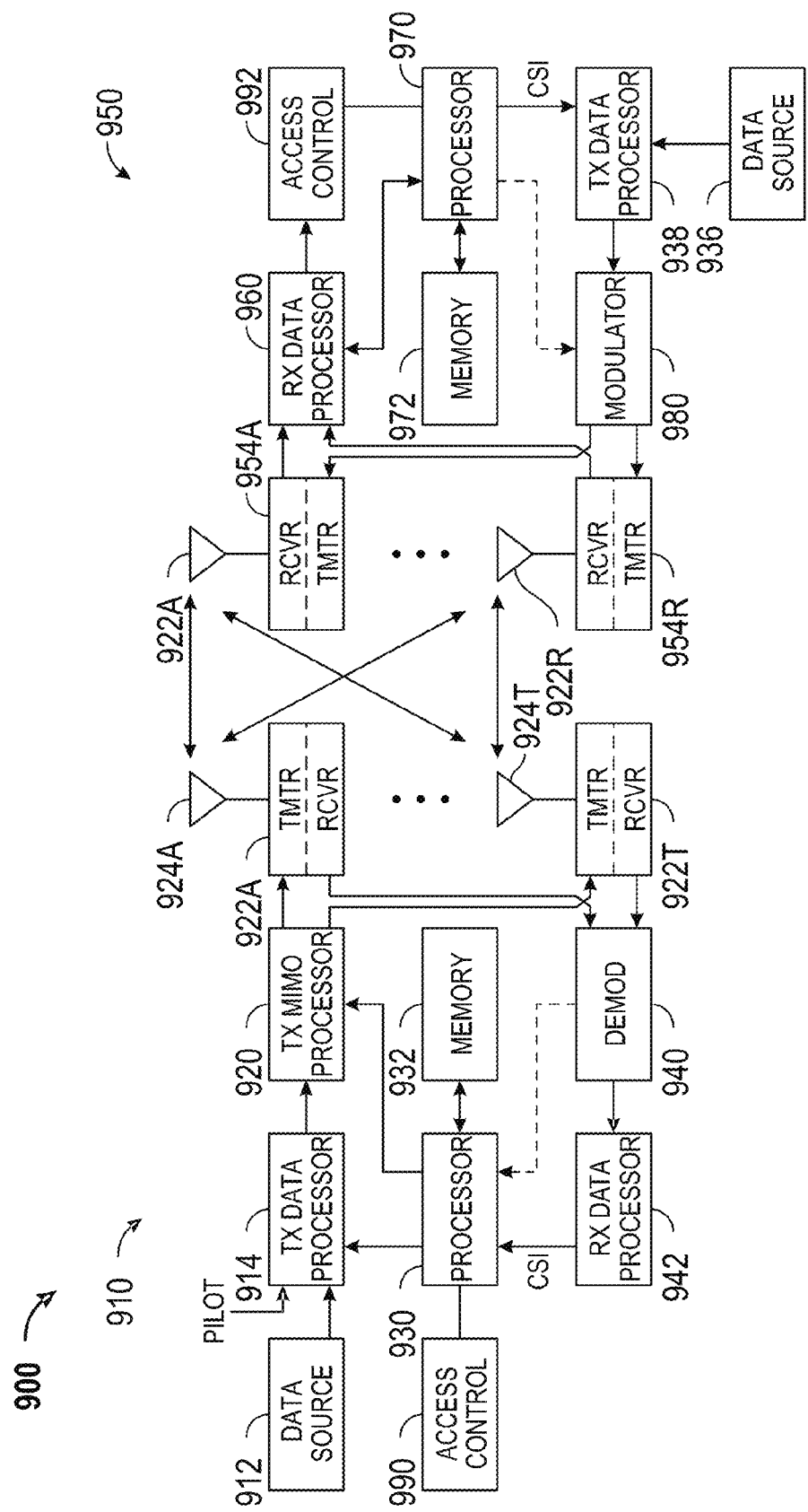
FIG. 9 shows an example of a functional block diagram of various components in a communication system in accordance with some embodiments.

Furthermore, as indicated by the systems and methods described above, the teachings herein may be incorporated into a node (e.g., a device) employing various components for communicating with at least one other node. FIG. 9 depicts several sample components that may be employed to facilitate communication between nodes in accordance with some embodiments. Specifically, FIG. 9 is a simplified block diagram of a first wireless device 910 (e.g., an access point) and a second wireless device 950 (e.g., an access terminal) of a multiple-in-multiple-out (MIMO) system 900. At the first device 910, traffic data for a number of data streams is provided from a data source 912 to a transmit (Tx) data processor 914.

In some aspects, each data stream is transmitted over a respective transmit antenna. The Tx data processor 914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 930. A data memory 932 may store program code, data, and other information used by the processor 930 or other components of the device 910.

The modulation symbols for all data streams are then provided to a Tx MIMO processor 920, which may further process the modulation symbols (e.g., for OFDM). The Tx MIMO processor 920 then provides $N_T$ modulation symbol streams to $N_T$ transceivers (XCVR) 922A through 922T. In some aspects, the Tx MIMO processor 920 applies beam-forming weights to the symbols of the data streams and to the antenna from which the symbol is being transmitted.

Each transceiver 922 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transceivers 922A through 922T are then transmitted from $N_T$ antennas 924A through 924T, respectively.

At the second device 950, the transmitted modulated signals are received by $N_R$ antennas 952A through 952R and the received signal from each antenna 952 is provided to a respective transceiver (XCVR) 954A through 954R. Each transceiver 954 conditions (e.g., filters, amplifies, and down converts) a respective received signal, digitizes the conditioned signal to provide samples, and further processes the samples to provide a corresponding "received" symbol stream.

A receive (RX) data processor 960 then receives and processes the $N_R$ received symbol streams from $N_R$ transceivers 954 based on a particular receiver processing technique to provide $N_T$ "detected" symbol streams. The RX data processor 960 then demodulates, deinterleaves, and decodes each detected symbol stream to recover the traffic data for the data stream. The processing by the RX data processor 960 is complementary to that performed by the Tx MIMO processor 920 and the Tx data processor 914 at the device 910.

A processor 970 periodically determines which pre-coding matrix to use (discussed below). The processor 970 formulates a reverse link message comprising a matrix index portion and a rank value portion. A data memory 972 may store program code, data, and other information used by the processor 970 or other components of the second device 950.

The reverse link message may comprise various types of information regarding the communication link and/or the received data stream. The reverse link message is then processed by a Tx data processor 938, which also receives traffic data for a number of data streams from a data source 936, modulated by a modulator 980, conditioned by the transceivers 954A through 954R, and transmitted back to the device 910.

At the device 910, the modulated signals from the second device 950 are received by the antennas 924, conditioned by the transceivers 922, demodulated by a demodulator (DEMOD) 940, and processed by a RX data processor 942 to extract the reverse link message transmitted by the second device 950. The processor 930 then determines which pre-coding matrix to use for determining the beam-forming weights then processes the extracted message.

FIG. 9 also illustrates that the communication components may include one or more components that perform access control operations as taught herein. For example, an access control component 990 may cooperate with the processor 930 and/or other components of the device 910 to send/receive signals to/from another device (e.g., device 950) as taught herein. Similarly, an access control component 992 may cooperate with the processor 970 and/or other components of the device 950 to send/receive signals to/from another device (e.g., device 910). It should be appreciated that for each device 910 and 950 the functionality of two or more of the described components may be provided by a single component. For example, a single processing component may provide the functionality of the access control component 990 and the processor 930 and a single processing component may provide the functionality of the access control component 992 and the processor 970. Furthermore, the components of the apparatus 900 described with reference to FIG. 3 may be incorporated with/into the components of FIG. 9.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-9 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the embodiments described in this disclosure may be readily apparent to those skilled in the art, and the generic principles defined herein may be applied to other embodiments without departing from the spirit or scope of this disclosure. Thus, the disclosure is not intended to be limited to the embodiments shown herein, but is to be accorded the widest scope consistent with the claims, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments.

Certain features that are described in this specification in the context of separate embodiments also can be implemented in combination in a single embodiment. Conversely, various features that are described in the context of a single embodiment also can be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

What is claimed is:

1. A wireless communications apparatus, comprising:
   a plurality of antennas including a first antenna and a second antenna;
   a receive or transmit circuit; and
   a controller configured to:
   determine one or more performance characteristics associated with the first antenna while the receive or transmit circuit is receiving or transmitting wireless communications via the first antenna;
   switch the receive or transmit circuit from receiving or transmitting wireless communications via the first antenna to receiving or transmitting wireless communications via the second antenna;
   determine one or more performance characteristics associated with the second antenna after the switch;
   compare the performance characteristics associated with the first antenna to the performance characteristics associated with the second antenna;
   determine whether to maintain the switch of the receive or transmit circuit to the second antenna or to switch the receive or transmit circuit back to the first antenna based on the comparison of the performance characteristics associated with the first antenna to the performance characteristics associated with the second antenna; and
   determine a duration of time to maintain a connection between one of the first and second antennas and the receive or transmit circuit based, at least, on the comparison of the performance characteristics associated with the first antenna and the second antenna.

2. The apparatus of claim 1, wherein the determination of a duration of time to maintain a connection between one of the first and second antennas and the receive or transmit circuit is based, at least, on a dynamic time hysteresis.

3. The apparatus of claim 1, wherein the determination of a duration of time to maintain a connection between one of the first and second antennas and the receive or transmit circuit is based, at least, on a progressive determination.

4. The apparatus of claim 3, wherein the determination of a duration of time to maintain a connection between one of the first and second antennas and the receive or transmit circuit is further based, at least, on a dynamic time hysteresis.

5. The apparatus of claim 1, wherein the determination of a duration of time to maintain a connection between one of the first and second antennas and the receive or transmit circuit can result in at least two different lengths of time.

6. The apparatus of claim 1, wherein the determination of a duration of time to maintain a connection between one of the first and second antennas and the receive or transmit circuit can result in at least three different lengths of time.

7. The apparatus of claim 1, wherein the determination of a duration of time to maintain a connection between one of the first and second antennas and the receive or transmit circuit is based, at least, on one or more thresholds.

8. A method of wireless communication comprising:
determining one or more performance characteristics associated with a first antenna while a receive or transmit circuit is receiving or transmitting wireless communications via the first antenna;
switching a receive or transmit circuit from receiving or transmitting wireless communications via the first antenna to receiving or transmitting wireless communications via a second antenna;
determining one or more performance characteristics associated with the second antenna after the switch;
comparing the performance characteristics associated with the first antenna to the performance characteristics associated with the second antenna;
determining whether to maintain the switch of the receive or transmit circuit to the second antenna or to switch the receive or transmit circuit back to the first antenna based on the comparison of the performance characteristics associated with the first antenna to the performance characteristics associated with the second antenna; and
determining a duration of time to maintain a connection between of the first and second antennas and the receive or transmit circuit based, at least, on the comparison of the performance characteristics associated with the first antenna and the second antenna.

9. The method of claim 8, wherein the determination of a duration of time to maintain a connection between one of the first and second antennas and the receive or transmit circuit is based, at least, on a dynamic time hysteresis.

10. The method of claim 8, wherein the determination of a duration of time to maintain a connection between one of the first and second antennas and the receive or transmit circuit is based, at least, on a progressive determination.

11. The method of claim 10, wherein the determination of a duration of time to maintain a connection between one of the first and second antennas and the receive or transmit circuit is further based, at least, on a dynamic time hysteresis.

12. The method of claim 8, wherein the determination of a duration of time to maintain a connection between one of the first and second antennas and the receive or transmit circuit can result in at least two different lengths of time.

13. The method of claim 8, wherein the determination of a duration of time to maintain a connection between one of the first and second antennas and the receive or transmit circuit can result in at least three different lengths of time.

14. The method of claim 8, wherein the determination of a duration of time to maintain a connection between one of the first and second antennas and the receive or transmit circuit is based, at least, on one or more thresholds.

15. A wireless communications apparatus, comprising:
means for receiving or transmitting wireless communications using at least either a first antenna or a second antenna;
means for determining one or more performance characteristics associated with the first antenna;
means for switching the means for receiving or transmitting wireless communications from receiving or transmitting wireless communications via the first antenna to receiving or transmitting wireless communications via the second antenna;
means for determining one or more performance characteristics associated with the second antenna after the switch;
means for comparing one or more performance characteristics associated with the first antenna to one or more performance characteristics associated with the second antenna;
means for determining based at least in part on results obtained from the means for comparing whether to maintain a switch of the means for receiving or transmitting to receiving or transmitting via the second antenna or whether to switch the means for receiving or transmitting back to receiving or transmitting via the first antenna; and
means for determining a duration of time to maintain a connection between one of the first and second antennas and the means for receiving or transmitting based, at least, on the comparison of the performance characteristics associated with the first antenna and the second antenna.

16. The apparatus of claim 15, wherein the means for determining a duration of time to maintain a connection between one of the first and second antennas and the means for receiving or transmitting is based, at least, on a dynamic time hysteresis.

17. The apparatus of claim 15, wherein the means for determining a duration of time to maintain a connection between one of the first and second antennas and the means for receiving or transmitting is based, at least, on a progressive determination.

18. The apparatus of claim 17, wherein the means for determining a duration of time to maintain a connection between one of the first and second antennas and the means for receiving or transmitting is based, at least, on a dynamic time hysteresis.

19. The apparatus of claim 15, wherein the means for determining a duration of time to maintain a connection between one of the first and second antennas and the means for receiving or transmitting can result in at least two different lengths of time.

20. The apparatus of claim 15, wherein the means for determining a duration of time to maintain a connection between one of the first and second antennas and the means for receiving or transmitting can result in at least three different lengths of time.

21. The apparatus of claim 15, wherein the means for determining a duration of time to maintain a connection between one of the first and second antennas and the means for receiving or transmitting is based, at least, on one or more thresholds.

22. A computer program product, comprising:
a non-transitory computer readable storage medium comprising:
code for determining one or more performance characteristics associated with a first antenna while a receive or transmit circuit is receiving or transmitting wireless communications via the first antenna;
code for switching the receive or transmit circuit from receiving or transmitting wireless communications via the first antenna to receiving or transmitting wireless communications via a second antenna;
code for determining one or more performance characteristics associated with the second antenna;
code for comparing one or more performance characteristics associated with the first antenna to one or more performance characteristics associated with the second antenna;
code for determining based at least in part on results obtained from the code for comparing whether to maintain a switch of the receive or transmit circuit to receiving or transmitting via the second antenna or whether to switch the receive or transmit circuit back to receiving or transmitting via the first antenna; and
code for determining a duration of time to maintain a connection between one of the first and second antennas and the receive or transmit circuit based, at least, on the comparison of the performance characteristics associated with the first antenna and the second antenna.

23. The computer program product of claim 22, wherein the code for determining a duration of time to maintain a connection between one of the first and second antennas and the receive or transmit circuit further bases its determination on, at least, a dynamic time hysteresis.

24. The computer program product of claim 22, wherein the code for determining a duration of time to maintain a connection between one of the first and second antennas and the receive or transmit circuit further bases its determination on, at least, a progressive determination.

25. The computer program product of claim 24, wherein the code for determining a duration of time to maintain a connection between one of the first and second antennas and the receive or transmit circuit further bases its determination on, at least, a dynamic time hysteresis.

26. The computer program product of claim 22, wherein the code for determining a duration of time to maintain a connection between one of the first and second antennas and the receive or transmit circuit can result in at least two different lengths of time.

27. The computer program product of claim 22, wherein the code for determining a duration of time to maintain a connection between one of the first and second antennas and the receive or transmit circuit can result in at least three different lengths of time.

28. The computer program product of claim 22, wherein the code for determining a duration of time to maintain a connection between one of the first and second antennas and the receive or transmit circuit further bases its determination on, at least, one or more thresholds.

* * * * *